United States Patent [19]

Boozer

[11] Patent Number: 4,658,806

[45] Date of Patent: * Apr. 21, 1987

[54] SOLAR RADIATION ASSEMBLY

[75] Inventor: S. David Boozer, 1417 Nokomis Pass, Anniston, Ala. 36201

[73] Assignee: S. David Boozer, Anniston, Ala.

[*] Notice: The portion of the term of this patent subsequent to May 21, 2003 has been disclaimed.

[21] Appl. No.: 334,990

[22] Filed: Dec. 28, 1981

[51] Int. Cl.$^4$ .................... F24J 3/02; A47H 1/00
[52] U.S. Cl. .................... 126/450; 160/107; 126/419
[58] Field of Search .......... 126/417, 418, 419, 426, 126/428, 429, 431, 438, 439, 441, 449, 450; 160/107, 120; 52/788

[56] References Cited

U.S. PATENT DOCUMENTS 4,279,240 7/1981 Artrsy .................... 126/419

FOREIGN PATENT DOCUMENTS 3005809 9/1980 Fed. Rep. of Germany ...... 126/419
2935982 4/1981 Fed. Rep. of Germany ........ 52/788
0134244 10/1980 Japan .................... 126/417

Primary Examiner—Samuel Scott
Assistant Examiner—G. Anderson

[57] ABSTRACT

A solar radiation assembly forming a portion of an envelope of a building wherein sunlight entering the building is selectively regulated by exterior and interior variable radiation transmission assemblies positioned, respectively, on the outside and inside of a central unit of glazing. The exterior assembly includes adjustable reflective vanes and an outer protective glazing. The interior assembly comprises adjustable dark colored vanes and a retractable insulating cover positioned between the inner vanes and the central glazing. Additionally, where thermal insulating glazing is employed as a glazing unit, the integrity of sealed air chambers between layers of glazing are protected by an expandable bladder.

4 Claims, 6 Drawing Figures

SOLAR RADIATION ASSEMBLY

TECHNICAL FIELD

This invention relates generally to solar radiation systems, and more particularly to a system for selectively controlling the quantity, direction, and utilization of solar radiation in the control of temperature within a building.

BACKGROUND ART

Since earliest times, man has used energy in one form or another to heat his shelter. The energy employed has ranged from wood, coal, gaseous fuels, liquid fuels and electricity to solar energy. Solar energy in recent years has become increasingly important because it is unlimited in quantity and consumes no non-renewable natural resources. Fossil fuels, such as oil and gas, have become more scarce and costly. Electrical energy, while employed for many diverse purposes, including heating and cooling of habitable structures, is a secondary form of energy requiring some primary form of energy for its generation, such as fossil fuels or nuclear and hydroelectrical power. While hydroelectrical plants are used to generate electrical power using the energy of renewable resources, locations for such plants are finite and limited in nature and produce an expensive end product. Therefore, the one source of electrical power which is a form of renewable non-depleting energy comprises only a small fraction of the electrical energy generated in the United States. Nuclear power as an energy source for the production of electricity has been recently employed. Several years ago, nuclear energy was billed as being the method of producing electricity in a very economical manner; but because of the necessary controls which have been required for the nuclear functions and the control of the by-products, the plants using nuclear fuels have become exceedingly expensive and still may pose a severe hazard to all living things. For ecology reasons, total development of electrical power plants has been impeded, and world conditions have decreased our access to oil. This has, therefore, increased the need to utilize the relatively free energy of the sun.

Solar energy has, therefore, become a very important factor in the search for alternative sources of energy. Probably the principal limiting factor in the use of solar energy has been the lack of appropriate devices and mechanisms to efficiently capture and utilize the available radiant energy and light from the sun for use in retrofitting existing structures and for versatile employment in new construction.

During recent years, a number of mechanisms and devices for capturing the sun's energy and using it for heating and cooling have been developed. These include mechanisms which capture the radiant energy of the sun to raise the temperature of water or other fluids or air so that heat can be moved from one place to another for its intended use. Most of these systems are expensive, inefficient, and distract from the aesthetic appeal of the structures on which they are employed.

Another form of energy conversion is direct sunlight-to-electrical energy conversion units, primarily silicon cells. While these devices do work, they are quite inefficient, very expensive, and perform poorly except in bright direct sunlight. Their application for economic usage has, therefore, been quite limited.

Primarily there are two basic types of solar energy systems, and a combination of these two systems. The first type is the active system, mainly described above. It has evolved that the second type, or passive solar energy system, is exceedingly the most efficient; however, there are many drawbacks to these systems, including the lack of control of heating which produces overheating at times when the sun is most available, and a problem of not being able to reject the heat during periods when heating is not desired. A third type, the hybrid system, makes use of the passive collecting of heat, which is the direct collecting of heat through an aperture and the storage of that heat in some medium, such as a mass of building materials, including masonry and concrete, or in the use of phase-change materials. Even in the hybrid system, there is a lack of control, and there is no known system available which can control solar heating efficiently and effectively and be able to reject the heating when it is undesirable within short time intervals.

It is the object of this invention to provide a new and improved system of controlling the quantity of radiation entering a building, the direction of transmission of it within the building, and the absorption of it.

DISCLOSURE OF THE INVENTION

In accordance with this invention, a variable radiation transmission assembly is positioned over the outer side of the glazing of a building. This assembly includes a series of rotatable reflective vanes which are controlled from within the building, and an adjacent, outer, protective cover of glazing. A shield is positioned across the top of the assembly which blocks rain but permits air flow. A hinge and a support arm enable the assembly to be tilted away from the building to facilitate cleaning.

DETAILED DESCRIPTION OF THE DRAWINGS

Figure 1:
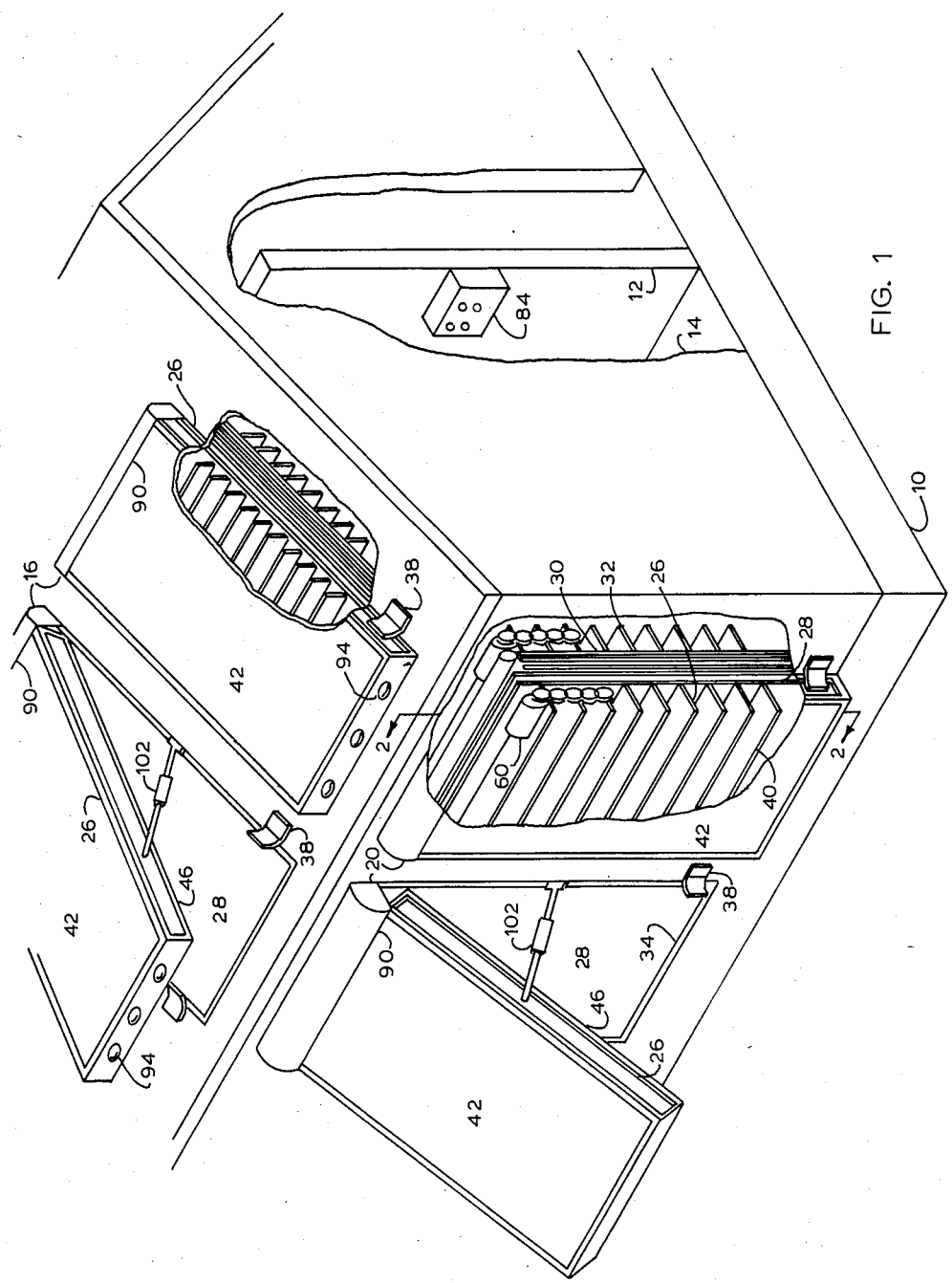
FIG. 1 is an isometric view of a building having enlarged cut-away views of roof and wall mounted light transmission units.

Referring to the drawings, and initially to FIG. 1, there is shown a building 10 having typical interior partitions 12 and an outer wall or envelope 14. Solar heating for building 10 is provided through roof mounted solar units 16 and wall mounted units 20. All four are basically alike and are more particularly illustrated by a sectional view of one of them as shown in FIG. 2.

Figure 2:
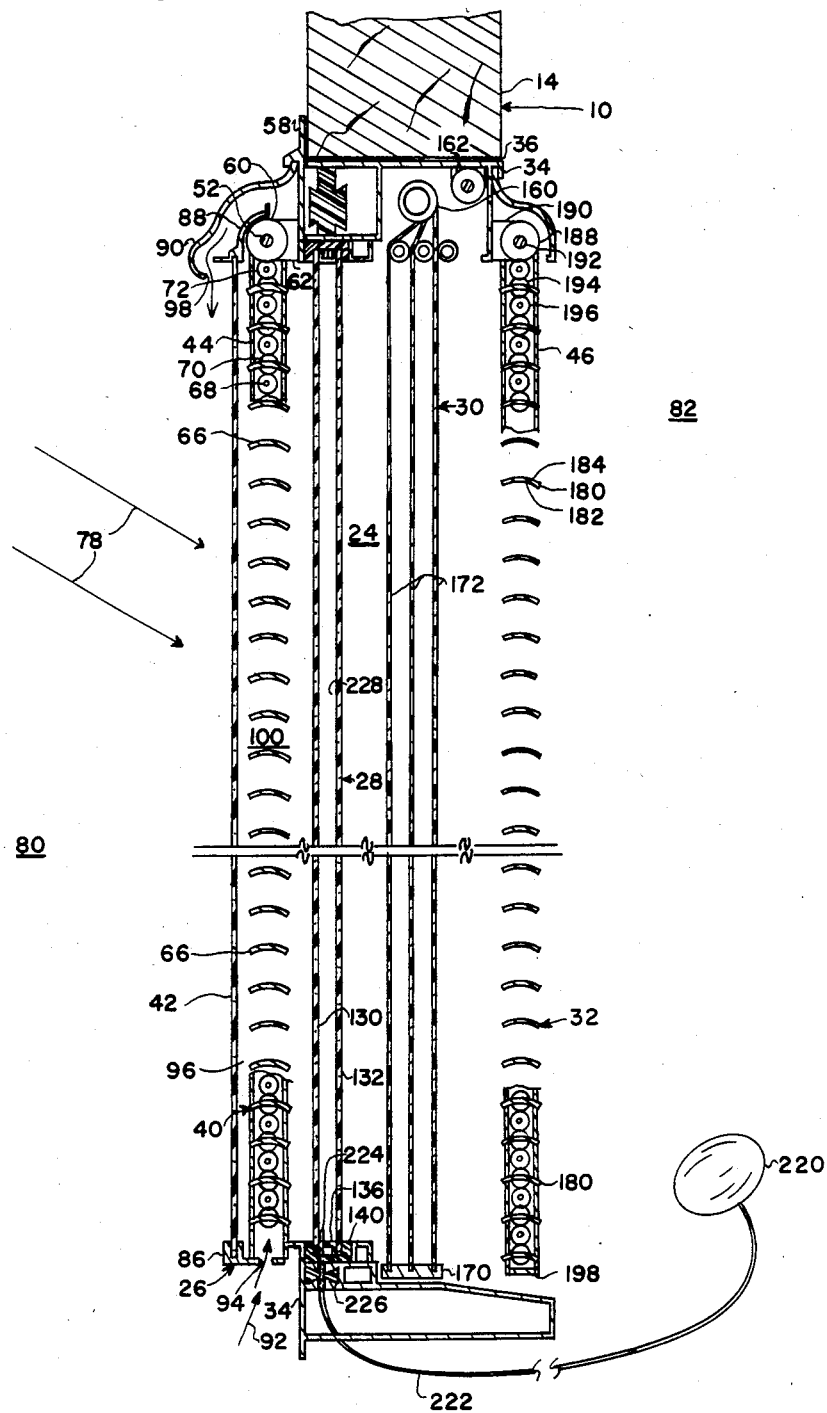
FIG. 2 is a sectional view taken along line 2—2 of FIG. 1.

Referring more particularly to FIG. 2, there are basically four light transmission assemblies forming a wall or roof light transmission unit 24. From outside to inside they are: outer transmission assembly 26, basic or central glazing assembly 28, retractable insulating cover assembly 30, and inside vane assembly 32. The entire light transmission unit 24 is positioned within and supported by a rectangular frame 34 mounted within an opening 36 in building 14 by brackets 38 (FIG. 1).

Figure 3:
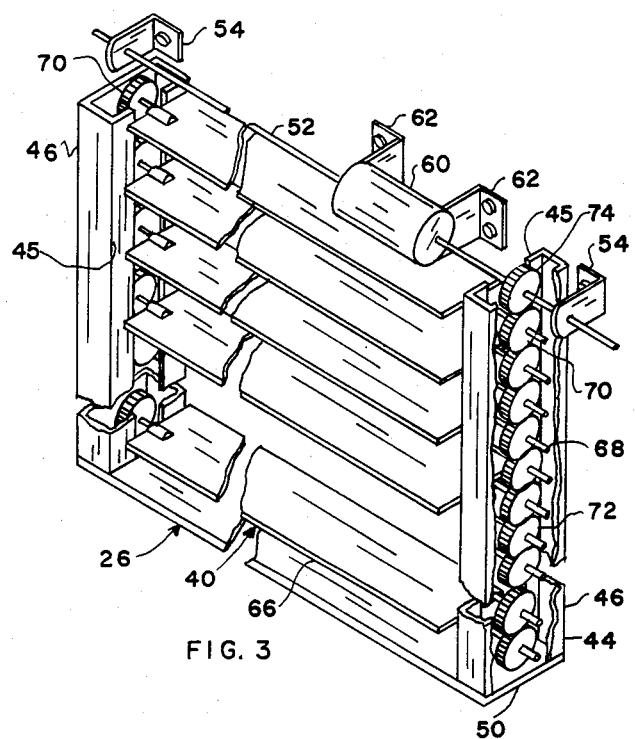
FIG. 3 is an isometric view of a portion of an outer vane assembly.

Referring now to FIGS. 2 and 3, outer light transmission assembly 26 employs a vane assembly 40 and an outer glazing 42 supported in a rectangular frame 44, illustrated as being cut away in FIG. 3, with lip 45 not shown in FIG. 2. Frame 44 employs a pair of channel-shaped frame members 46 and a lower connecting frame member 50. Frame 44 is pivotally supported by means of a rod or shaft 52 on brackets 54, which attach to a frame extension 58 (FIG. 2) on frame 34. Rod 52 may be a shaft extension of motor 60, which is attached by brackets 62 to frame extension 58 on frame 34 if motor rather than manual drive is preferred. A plurality of reflective vanes 66 are pivotally supported via a plurality of stubshafts 68 on frame members 46, which are driven through gear wheels 70 attached to each vane and interconnected by coupling gears 72. Gears 74 (only one of which is shown) on shaft 52 drive gears 70 and 72 to rotate vanes 66, in unison, along their longitudinal axis wherein external solar radiation 78 is reflected in a specific direction either to the exterior 80 or interior 82 of building 10. A conventional motor control 84 (FIG. 1), which operates motor 60, is located within building 10.

An outer glazing 42 is supported on frame 44 by glazing support 86, and a curved limiting extension 88 of glazing support 86 extends upward and over motor 60 to assist in providing some weather protection. A protective shield 90 is connected to frame extension 58 on frame 34. By the combination of solar radiation 78 and thermodynamic convection and conduction, air flow 92 through outer vane assembly 40 enters at opening 94, moves upward through the air space 96 between glazing 42 and central glazing assembly 28, and exits through opening 98 between frame extension 58 and protective shield 90 at the upper region of outer transmission assembly 26. Protective shield 90 provides substantial protection against rain entering the top region of transmission assembly 26.

Outer light transmission assembly 26 is movable away from its normal position, as shown in FIG. 2, to an extended position, as shown in FIG. 1, with respect to roof mounted unit 16 and wall mounted unit 20. Hinged arms 102, which connect between frame 34 and frame members 46, maintain light transmission assembly 26 in its extended position to provide for access to vane assembly 40 and air space 96 between glazing 42 and central glazing assembly 28. This access is for maintenance and cleaning purposes.

Central glazing assembly 28, positioned interior of outer transmission assembly 26, consists of spaced layers of glazing 130 and 132 supported in a sealer/spacer 136 which joins the edges of said glazings. This sealer/spacer 136 is in turn supported by support cavity 138 (FIG. 4) in frame 34 and by material 140.

Retractable insulating cover assembly 30 is just interior of glazing 132. This cover consists of several layers of material 172, such as mylar (where it is to be transparent), separately wound on a conventional roll 160, which may be manually operated or driven by a motor 162 through conventional coupling means (not shown). Roll 160, supported by means not shown, is illustrated as being driven by a motor 162 and being controlled by motor control 84 (FIG. 1). In the unwound, spaced, state, layers 172 form an insulating cover. In roof mounted solar units 16, lower support 170 is connected to a cable and pulley means (not shown) wherein the unwound insulating material 172 is maintained parallel to glazing 132. The material of these layers typically may be made either of a transparent material or an opaque material, as desired. Where necessary, guides or supports for each layer may be employed.

Still referring to FIG. 2, inner vane assembly 32 is positioned interior of insulating cover assemby 30 and comprises a similar mechanical structure to that of outer vane assembly 40. Vanes 180 of inside vane assembly 32 contain at least one dark colored surface 182, while the other side 184 may be dark colored or reflective. These vanes 180 are illustrated as being driven by a motor 188 controlled by motor control 84 (FIG. 1), yet they may be manually operated. Motor 188, supported by brackets 190 attached to frame 34, drives a shaft 192, which in turn drives vane gears 194 and coupling gears 196. Gears 194 are attached to stubshafts 68 to vanes 180. In roof mounted solar units, the lower extremity of frame member 198 (only one is shown) is connected (by means not shown) to frame 34 positioned below it. Conventional reversible motor control 84 (FIG. 1), which controls motor 188, is located within building 10.

FIG. 2 also illustrates, in general, a system for preventing significant pressure changes from occurring within glazings having sealed double glazed panels, such as shown by layers 130 and 132 of central glazing assembly 28. As is well known, such pressure changes will frequently rupture seals, in this case, sealing supports 136, holding the glazing together. When this occurs, moisture and other foreign material is often drawn between the glazings, causing them to fog. As shown, partially diagrammatically in FIG. 2, a remotely located vinyl bladder 220 is connected via a tube 222 through a tubular passageway 224 in seal 226 to the interior region 228 between layers 130 and 132 of central glazing assembly 28. Any variation in pressure within region 228 between layers 130 and 132 causes a corresponding movement of air toward or away from central glazing assembly 28 through tubing 222 to bladder 220 and causes a corresponding expansion or contraction of flexible bladder 220 as needed to reduce this pressure gradient.

Figure 4:
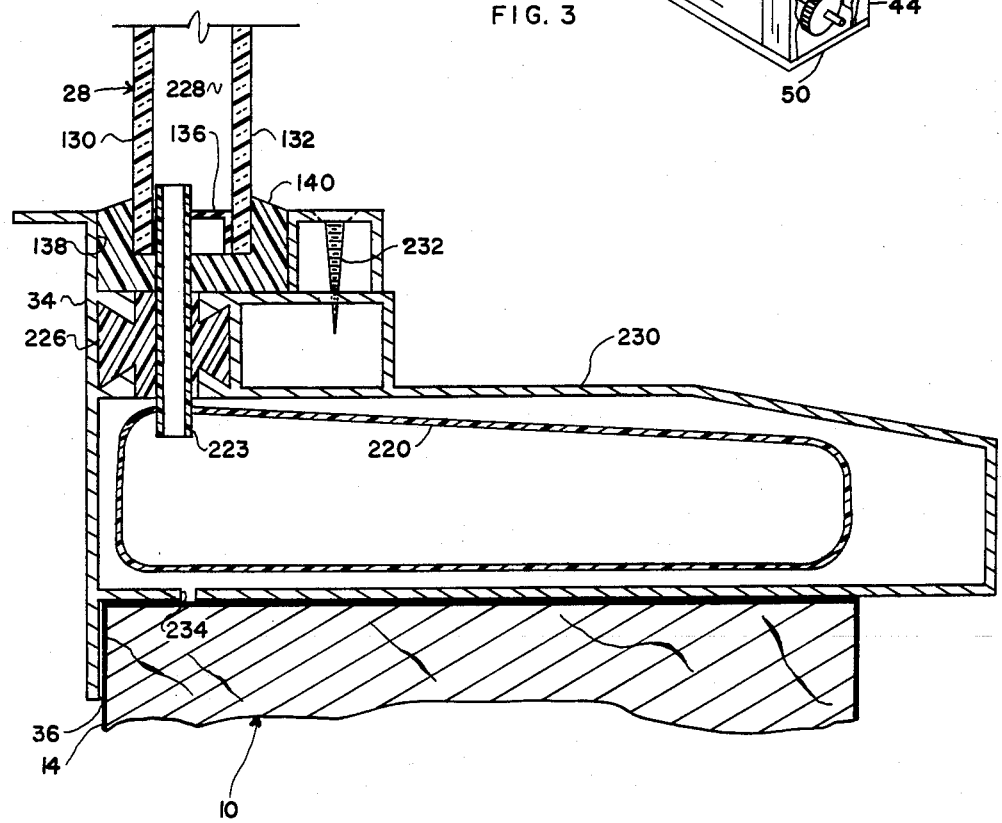
FIG. 4 is an enlarged, partial cross sectional, view of an alternate embodiment taken along line 2—2 of FIG. 1 of an aspect of the invention.

FIG. 4 illustrates a more specific embodiment of a pressure equilization system wherein bladder 220 is positioned within a glazing support frame 230. This frame 230, containing opening 234, is attached by screws 232 to frame 34, positioned in building 10. Bladder 220 is connected via tube 223 to the interior region 228 between sealed glazing units 130 and 132. Thus, any tendency of pressure change in region 228 will produce a variation in the dimension of bladder 220, an increasing or decreasing one, to offset a change in pressure. As an illustration of the function of bladder 220, when solar radiation 78 (FIG. 2) heats the air in region 228, this heated air expands, creating a difference in pressure from that of air contained in bladder 220. This pressure difference is transmitted via tube 222 to bladder 220, which expands to equalize pressure. Furthermore, when atmospheric pressure varies with respect to the pressure in region 228, bladder 220 expands or contracts to effectively eliminate the pressure difference.

Figure 5:
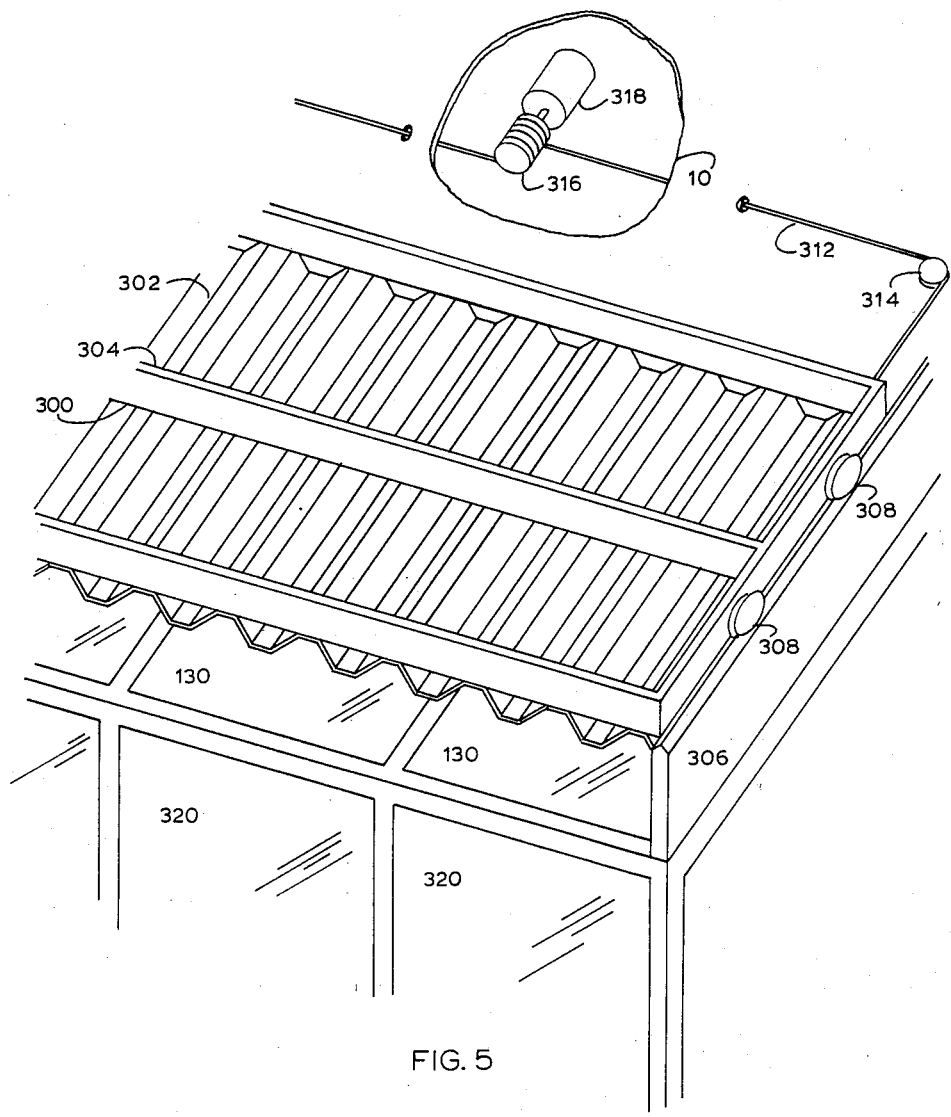
FIG. 5 is an isometric partial view of a building having roof and wall mounted light transmission units and an exterior reflective cover.

FIG. 5 is illustrative of a modification of the systems shown in FIGS. 1 and 2. In this modification, outer light transmission assembly 26 is omitted, this being illustrated by glazing 130 being directly viewable. Insulating cover assemblies 30 and inside vane assembly 32 are employed in the same manner as described with respect to FIG. 2. A reflective cover 300, formed of reflective sheet metal 302 and frame 304, is movable upon a pair of raised rails 306 (only one of which is shown), being movable on rollers 308 attached to metal frame 304. It is moved to either cover or expose glazing 130 by means of a cable 312 operating over pulleys 314 connected to a cable drum 316 coupled to motor 318 located within building 10. Motor control (not shown) located within building 10 operates motor 318. Front panels 320 are identical to the roof panels, having behind each glazing an insulating cover 30 and inside vane assembly 32, as shown in FIG. 2.

Figure 6:
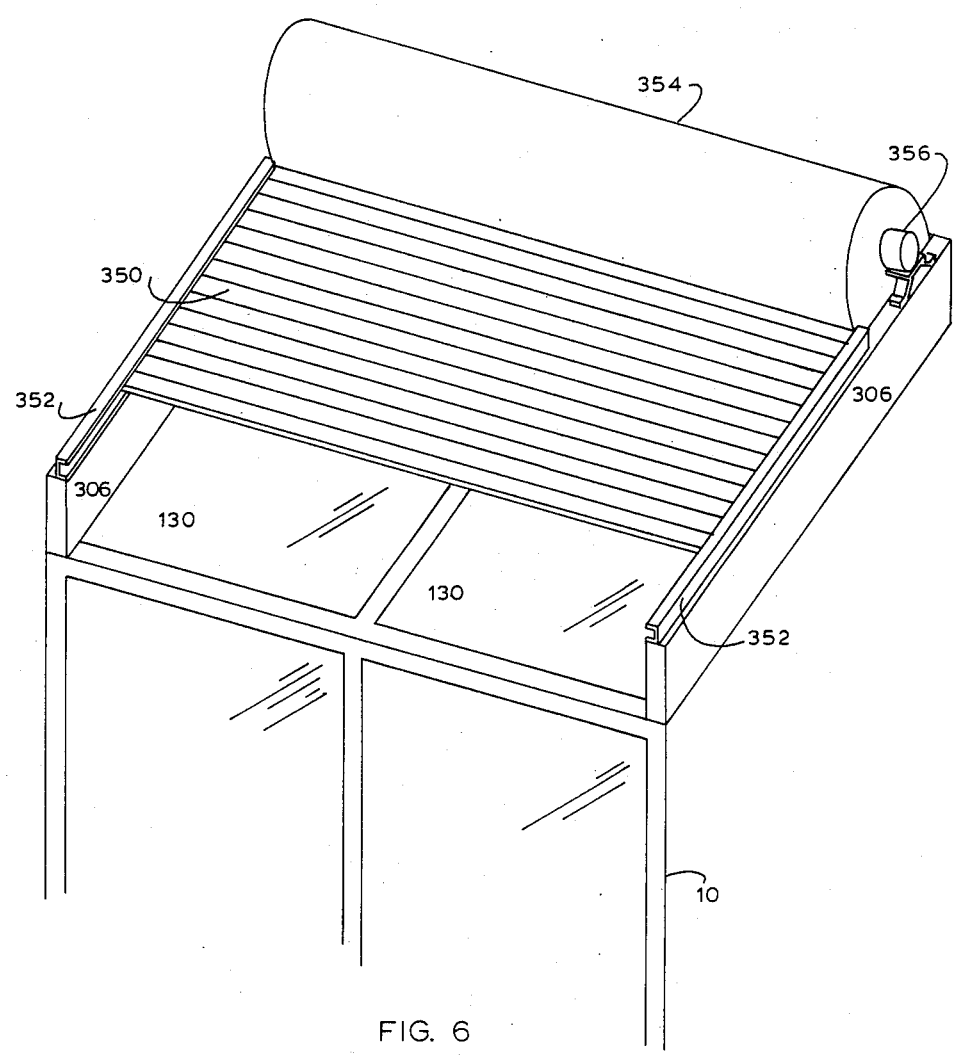
FIG. 6 is an isometric partial view of a building having roof and wall mounted light transmission units and an alternate exterior reflective cover.

FIG. 6 is similar to the assembly shown in FIG. 5 except that a roll-up reflective cover 350 is employed. Cover 350 is slidably supported by facing grooved tracks 352 which threads into a motor driven drum (not shown) covered by drum housing 354. A drive motor 356 is controlled by motor control (not shown) located within building 10. As described above, behind glazing 130 there is an inner insulating cover 30 and inside vane assembly 32 as illustrated in FIG. 2.

In summary, this invention provides a unique solar transmission system. By selectively configuring vane assemblies 32 and 40 and covers 300 or 350, solar radiation 78 may be quickly regulated to adapt to the interior needs of a building. During certain months when there is an over abundance of solar radiation and the problem is one of exclusion of it, reflective type exterior vanes 66 or covers 300 or 350 may be positioned to admit only that quantity of solar radiation 78 which is desirable. As the need for solar heat within the building varies, exterior vanes 66 or covers 300 or 350 may be positioned accordingly, ranging from fully closed, admitting no direct solar radiation, to fully open, admitting the maximum amount of solar radiation possible through central glazing assembly 28. In addition to selectively admitting only that quantity of solar radiation 78 desired, interior vanes 180 of inside vane assembly 32 may be oriented to direct the admitted solar radiation to a specified location within a building, or they may be oriented to absorb radiation. Alternately, they may be oriented to admit this radiation without either deflecting or absorbing it.

During the winter months when there is little excess solar radiation 78 available and a great need for solar heat within the building, exterior vanes 66 or covers 300 or 350 may be positioned to admit the maximum amount of solar radiation possible through central glazing assembly 28 into the building. In this situation, the interior vanes 180 may be similarly used to either direct, absorb, or admit the available radiation for maximum efficiency and usage. Exterior vanes 66 and covers 300 and 350 also serve to quickly protect the central glazing assembly 28 from damage during adverse weather conditions.

Insulating cover 30, located interior of central glazing assembly 28, is positioned in a lowered state (as shown) to retain the captured heat within the building when solar radiation 78 is no longer available as a source of heat. It may comprise either light transparent, translucent, or opaque material, as desired, to provide a full range of operation.

I claim:

1. A Solar transmission system comprising at least one radiation permeable assembly, in turn comprising:
   a light aperture adapted to be mounted in the envelope of a building, and having at least one layer of first glazing forming part of the building envelope;
   a generally rectangular frame supported on the building and around an outer side of a said aperture;
   a layer of second glazing comprising an outer facing of said frame;
   ventilation means at the top and bottom of said frame, including means for enabling air flow through said frame, and including means for inhibiting rain from entering said frame;
   support means connectible between said frame and said building, enabling said frame to be moved away from said building, whereby said glazing of said light aperture may be made accessible;
   a variable light transmission assembly comprising:
      a vane assembly comprising a plurality of adjacent reflective vanes supported by and within said frame, and
      operating means for synchronously rotating said vanes about a horizontal axis of each and in parallel planes, whereby exterior solar radiation may be reflected in a selected direction either to the interior or exterior of said building, and
   control means for controlling said operating means from inside said building;
   a second vane assembly comprising a plurality of adjacent second vanes supported by said building on an inner side of said first glazing, and at least one side of said vanes being of a dark color;
   second operating means for synchronously rotating said second plurality of adjacent vanes about a horizontal axis of each and in a parallel plane, whereby exterior solar radiation may be selectively absorbed or passed to the interior of said building; and
   second control means for controlling said second operating means from inside said building;
   a light transmissive insulating assembly positioned between said first glazing of said light aperture and said second variable light transmission assembly comprising:
   a plurality of layers of material;
   means for interconnecting and normally biasing said layers in a spaced relation over said aperture; and
   retraction means for retracting layers from their position over said aperture and rolling said layers onto a roll in adjacent and contacting layers.

2. A system as set forth in claim 1 wherein said aperture forms a portion of a side wall of a building, and both sides of said vanes of said second plurality of vanes are of a dark color.

3. A system as set forth in claim 1 wherein said aperture forms a portion of a roof of a building.

4. A system as set forth in claim 1 comprising:
   a first said controllable solar radiation permeable assembly, forming a portion of a roof of a building, and wherein one side of said second vanes are of a dark color;
   a second said controllable solar radiation permeable assembly, forming a portion of a side wall of said building, and wherein both sides of said second vanes are of a dark color.

* * * * *